Patented Nov. 5, 1940

2,220,774

UNITED STATES PATENT OFFICE 2,220,774

CERAMIC MATERIAL

Louis Navias, Schenectady, N. Y., assignor to General Electric Company, a corporation of New York No Drawing. Application December 30, 1937, Serial No. 182,563

11 Claims. (Cl. 106—12)

This invention relates broadly to ceramic materials. More specifically the invention is concerned with, and has as a principal object to provide a novel sintered or fired ceramic insulating material containing titanium dioxide and having a high dielectric constant and a low power factor.

There has been a growing need in the electrical art for insulating materials of the ceramic type that are mechanically strong, of high dielectric strength and, in addition, of high dielectric constant and low dielectric loss under high frequency. It has been suggested heretofore that a high proportion of titania (titanium dioxide) be incorporated in ceramic compositions to provide electrically insulating materials of high dielectric constant. In all cases a binder or flux for the titania is required. Bentonite and other plastic clayey and clay-like substances previously have been proposed as components of the ceramic body in order to bond the titanium dioxide particles into a solid mass. Alkali compounds are commonly present in such binders. Since alkali-containing substances generally have a detrimental effect upon the electrical properties of an insulating material, great care had to be exercised in the selection of the clayey binder and only the smallest possible amount necessary to produce the desired bond was used. Otherwise the electrical values were adversely affected to an excessive extent. Yet even with these precautions the requirements of the electrical art for ceramic materials for particular applications have not been wholly fulfilled.

In my copending application Serial No. 182,564, filed concurrently herewith, I disclosed and claimed ceramic materials comprising titanium dioxide and a bonding agent composed of a preformed substantially alkali-free glass. Such materials are characterized by their high dielectric constant and low power factor.

In accordance with the present invention improved clay-free ceramic insulating materials are produced by incorporating in the composition calcium titanium silicate ($CaTiSiO_5$), also known as titanite, as all or a substantial part of a bond for titanium dioxide. A typical analysis of a grade of calcium titanium silicate which has been used in practicing the present invention is as follows:

| | Per cent by weight |
|---|---|
| Calcium oxide (CaO) | 28.3 |
| Titanium dioxide ($TiO_2$) | 40.5 |
| Silica ($SiO_2$) | 30.3 |
| Iron oxide ($Fe_2O_3$) | 0.1 |
| Undetermined | 0.8 |

Other components in varying amounts also may be incorporated in the compositions of the invention.

The following examples are illustrative of how the present invention may be carried into effect:

Example 1

| | Parts by weight |
|---|---|
| Titanium dioxide | 90 |
| Calcium titanium silicate | 10 |

The finely divided titanium dioxide and calcium titanium silicate are wet or dry milled together to form a homogeneous mixture. If wet milled, the mixture is partly or completely dried, but preferably it is dried to a residual moisture content of about 5 or 6 per cent. The mass then is shaped, for example, by compressing by any suitable means and at any suitable pressure. For instance, the mass may be pressed into shape in a hardened steel mold under a hydraulic pressure of 500 to 20,000 pounds per square inch or more. The "green" compressed mass is fired in an oxidizing or inert atmosphere at any suitable temperature until it has become thoroughly vitrified. The temperature of firing ordinarily will be within the range of about 1150° C. to about 1450° C., depending upon the melting point of the particular grade of calcium titanium silicate employed, particle size of the titania, time of firing and other influencing factors. I have found that in most cases firing to Orton cone 10, which corresponds to a temperature of about 1260° C., in a commercial tunnel kiln 400 feet long gives a completely vitrified product. The compositions may be matured in a few hours in a laboratory kiln if fired to about 1350° C.

Example 2

| | Parts by weight |
|---|---|
| Titanium dioxide | 90 |
| Calcium titanium silicate | 5 |
| Magnesium oxide | 5 |

Example 3

| | Parts by weight |
|---|---|
| Titanium dioxide | 90 |
| Calcium titanium silicate | 5 |
| Beryllium oxide | 5 |

Example 4

| | Parts by weight |
|---|---|
| Titanium dioxide | 90 |
| Calcium titanium silicate | 3.4 |
| Magnesium oxide | 3.4 |
| Beryllium oxide | 3.4 |

Example 5

| | Parts by weight |
|---|---|
| Titanium dioxide | 90 |
| Calcium titanium silicate | 7.5 |
| Beryllium oxide | 2.5 |

*Example 6*

| | Parts by weight |
|---|---|
| Titanium dioxide | 90 |
| Calcium titanium silicate | 7.5 |
| Magnesium oxide | 2.5 |

Essentially the same general process of mixing, shaping and firing is followed in preparing the compositions of Examples 2 to 6, inclusive, as described under Example 1.

The vitrified ceramic materials made as described under the foregoing examples are suitable for use as condensers or capacitors. The sintered or vitrified compositions are mechanically strong, dense, homogeneous, have high dielectric strength, low power factor and high dielectric constant. In some cases the power factor is below 0.0002 when measured at 25° C. and 1000 kilocycles, and is of the order of mica.

In Table I are shown the average values for power factor and dielectric constant at 25° C. and 1000 kilocycles on representative samples of vitrified bodies in the form of disks approximately one-quarter inch thick made as described under each of Examples 1 to 6, inclusive.

*Table I*

| Example | 1 | 2 | 3 | 4 | 5 | 6 |
|---|---|---|---|---|---|---|
| Power factor | 0.0005 | 0.0003 | 0.0005 | 0.0002 | 0.0008 | 0.0002 |
| Dielectric constant | 108 | 78 | 95 | 85 | 88 | 85 |
| Approximate diameter of test disks, in inches | 2¼ | 2¼ | 2¼ | 2¼ | 4½ | 4½ |

The dielectric strength of the new ceramic materials on a 60-cycle A. C. puncture voltage test in air is of the order of 100 to 150 volts per mil thickness.

By varying the proportions of the different components, sintered compositions of varying physical and electrical characteristics may be obtained. In general, however, the raw ceramic mix should contain from about 40 to 95 or more parts $TiO_2$ to about 60 to 5 parts or less $CaTiSiO_5$, and preferably contains from about 80 to 95 parts $TiO_2$ to about 20 to 5 parts $CaTiSiO_5$. The calcium titanium silicate may be replaced in part by non-clayey (clay-free) components adapted to bond the titania particles, for example, by magnesia, beryllia, or mixtures thereof.

What I claim as new and desire to secure by Letters Patent of the United States is:

1. A ceramic mix especially adapted for the production of matured ceramic materials having a high dielectric constant and a low power factor, said mix containing, by weight, from about 40 to 95 parts titanium dioxide and from about 60 to 5 parts of a clay-free inorganic binder, said binder comprising calcium titanium silicate in the said binder.

2. A dense, vitrified ceramic material comprising titanium dioxide and a clay-free bonding agent, said bonding agent comprising calcium titanium silicate.

3. A dense, homogeneous mass of titanium dioxide particles bonded together with from about 5 to 60 per cent by weight of the whole of a clay-free inorganic binder, said binder comprising calcium titanium silicate.

4. A ceramic material having a high dielectric constant and a low power factor and comprising a fired mixture containing 40 to 95 per cent by weight of titanium dioxide particles and substantially all the remainder of said mixture being a titanium compound consisting of calcium titanium silicate as a binder for the said titanium dioxide particles.

5. A dense ceramic material comprising the resultant of firing at an elevated temperature a mixture of, by weight, 80 to 95 parts of titanium dioxide and 20 to 5 parts of a clay-free bonding medium, said bonding medium comprising calcium titanium silicate, said calcium titanium silicate being the only titanium compound constituting a component of the said bonding medium.

6. A dense ceramic material comprising the resultant of firing to vitrification a mixture of, by weight, 80 to 95 per cent titanium dioxide and the remainder a clay-free inorganic binder adapted to bond the titanium dioxide, said binder comprising calcium titanium silicate and beryllium oxide.

7. A dense ceramic material having a high dielectric constant and a low power factor and obtained by firing to vitrification a mixture of, by weight, 80 to 95 parts of titanium dioxide and 20 to 5 parts of a clay-free inorganic binder, said binder comprising calcium titanium silicate and magnesium oxide.

8. A dense ceramic material having a high dielectric constant and a low power factor and obtained by firing to vitrification a mixture of, by weight, 80 to 95 per cent titanium dioxide and the remainder a clay-free inorganic binder adapted to bond the titanium dioxide, said binder comprising calcium titanium silicate, beryllium oxide and magnesium oxide.

9. A matured ceramic material having a high dielectric constant and a low power factor and obtained by firing at an elevated temperature a mixture of the following substances approximately in the proportions stated:

| | Parts by weight |
|---|---|
| Titanium dioxide | 90 |
| Calcium titanium silicate | 3.4 |
| Magnesium oxide | 3.4 |
| Beryllium oxide | 3.4 |

10. A process of producing a dense ceramic insulating material of high dielectric constant which comprises preparing a ceramic mix containing, by weight, from about 40 to 95 parts titanium dioxide and from about 60 to 5 parts of a clay-free inorganic binder, said binder comprising calcium titanium silicate, and firing said mix to vitrification.

11. A matured ceramic material having a high dielectric constant and a low power factor and obtained by firing to vitrification a mixture consisting, by weight, of approximately 90 parts titanium dioxide and approximately 10 parts calcium titanium silicate.

LOUIS NAVIAS.

CERTIFICATE OF CORRECTION.

Patent No. 2,220,774. November 5, 1940.

LOUIS NAVIAS.

It is hereby certified that error appears in the printed specification of the above numbered patent requiring correction as follows: Page 2, first column, lines 62 and 63, claim 1, strike out the words "in the said binder"; and second column, lines 17, 18 and 19, claim 5, strike out ", said calcium titanium silicate being the only titanium compound constituting a component of the said bonding medium"; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.